(12) United States Patent
Whitney et al.

(10) Patent No.: US 8,702,337 B2
(45) Date of Patent: Apr. 22, 2014

(54) LAMELLAR ROTATIONAL FLEXURE PIVOT

(75) Inventors: Robert M. Whitney, Whitesboro, NY (US); Charles B. Gibbons, Whitesboro, NY (US); Richard Donegan, Constantia, NY (US)

(73) Assignee: Riverhawk Company, New Hartford, NY (US)

( * ) Notice: Subject to any disclaimer, the term of this patent is extended or adjusted under 35 U.S.C. 154(b) by 24 days.

(21) Appl. No.: 13/400,791

(22) Filed: Feb. 21, 2012

(65) Prior Publication Data

US 2012/0213573 A1 Aug. 23, 2012

Related U.S. Application Data

(60) Provisional application No. 61/444,205, filed on Feb. 18, 2011.

(51) Int. Cl.
*F16C 11/12* (2006.01)

(52) U.S. Cl.
USPC .......................................... 403/220; 403/291

(58) Field of Classification Search
CPC ........... F16C 11/12; F16D 3/005; F16D 3/56; F16D 3/79; B23P 2700/12; F16F 1/027; F16F 3/02; F16F 2230/34; F16F 2230/36; F16F 2230/40; F16F 2236/085
USPC ............ 403/220, 221, 223, 229, 291; 267/25, 267/154, 158, 160, 276, 283, 285; 464/77, 464/94–99; 29/416, 428, 436, 896.9, 898
See application file for complete search history.

(56) References Cited

U.S. PATENT DOCUMENTS

| | | | |
|---|---|---|---|
| 3,277,555 A | 10/1966 | Kutash | |
| 3,811,665 A | 5/1974 | Seelig | |
| 3,825,992 A | 7/1974 | Troeger | |
| 3,909,077 A | 9/1975 | Leonarduzzi | |
| 4,405,184 A | 9/1983 | Bahiman | |
| 4,499,778 A | 2/1985 | Westhaver et al. | |
| 4,637,596 A | 1/1987 | Lewis | |
| 4,997,123 A | 3/1991 | Backus et al. | |
| 5,061,107 A | 10/1991 | Brooks | |
| 5,335,418 A | 8/1994 | Krivec | |
| 5,387,157 A * | 2/1995 | Nameny | 464/98 |
| 6,365,252 B1 | 4/2002 | Ortiz et al. | |
| 6,479,782 B1 * | 11/2002 | Blackburn | |
| 6,666,612 B2 | 12/2003 | Lorigny et al. | |
| 6,963,472 B2 | 11/2005 | He et al. | |

* cited by examiner

*Primary Examiner* — Michael P Ferguson
*Assistant Examiner* — Matthieu Setliff
(74) *Attorney, Agent, or Firm* — Woods Oviatt Gilman LLP

(57) ABSTRACT

A lamellar rotational flexure pivot may include a first pivot end, and second pivot end, and a divider layer positioned therebetween to allow first and second pivot ends to pivot relative to one another. The first and second pivot ends may include a plurality of spring layers and spacer layers that are stacked in alternating fashion to form the lamellar rotational flexure pivot.

27 Claims, 7 Drawing Sheets

LAMELLAR ROTATIONAL FLEXURE PIVOT

CROSS-REFERENCE TO RELATED APPLICATIONS

This application claims the benefit of U.S. Patent Application No. 61/444,205, filed Feb. 18, 2011, which is hereby incorporated by reference in its entirety.

FIELD OF THE INVENTION

The present invention relates to a lamellar rotational flexure pivot; in particular, the flexure pivot includes a first pivot end mounted to one object and a second pivot end that supports another object, wherein the supported object is supported on all degrees of freedom except rotation about a flexing axis of the flexure pivot. The first and second pivot ends of the flexure pivot may each include one or more flat spring layers that are stacked on top of one another with flat spacer layers disposed therebetween. The stacking of flat layers to form the flexure pivot enhances manufacturability, increases material options, reduces cost by facilitating automation techniques, and is dimensionally scalable, which enhances the size range which the flexure pivot can be applied.

BACKGROUND OF THE INVENTION

It is known that prior art flexure pivots may be configured as a cantilevered design (FIG. 1A) or a double ended design (FIG. 1B). In both cases, the primary biasing component of such a flexure pivot is a set of springs that are mounted in an "X" fashion, as best seen in FIG. 2. The springs mount to circular quarter segments, commonly referred to as quads, to form a core. The core of the flexure pivot is formed by bonding the edges of the springs to the quads. Bonding is often accomplished by braising or welding, but other bonding materials and methods may be used.

Current practice requires that the bonding occur in two steps, namely, during the assembly of the core and during final assembly of the flexure pivot. During core assembly, the quads and springs must be carefully assembled and held using a temporary technique that does not interfere with the bonding step. This is typically a delicate process requiring great care. Bonding permanently joins the core assembly. Structurally this is an important step because the joints between the quads and the springs must effectively support all of the loads that are applied to the flexure pivot in service. The cross-section of these joints is relatively small which further raises the priority of these joints.

Once the core is successfully bonded, clearances called undercuts must be machined into the outer diameter of the core, as best seen in FIG. 3. Machining of the undercuts requires a special eccentric machining technique in order to generate the proper shape so that the clearances are only created in places that allow flexure in specific places. Forming and aligning the undercuts is a delicate process requiring close alignment for proper pivot function. The core is then mounted into a sleeve (shown in FIGS. 1A and 1B), which serves as the mounting interface for applications where the finished flexure pivot is used. The core must be bonded to the sleeve to form a unit, which requires a second fixturing and bonding process. After the core is bonded to the sleeve, the unit must be sawed to length and the sleeve must be split. After splitting the sleeve, the unit becomes flexible, thereby forming one of the prior art flexure pivots shown in FIGS. 1A and 1B.

The processes required to build a prior art flexure pivot has a significant number of challenges that make it expensive, limits the materials of construction, and limits the size and configuration of potential products the flexure pivot may be used with. There are several prior art flexure pivots that integrate the quads with the sleeve, but these require generating complex parts that still require careful alignment and assembly for proper operation.

There are a number of challenges presented by the construction of prior art flexure pivots. One of these challenges is that the thickness of the springs defines the strength and flexibility of the flexure pivot. This requires that the springs be precision rolled to the required thickness. Not all materials are suitable for rolling into thin sections and to a tight tolerance. This severely limits number of available materials that may be used to form the springs. Moreover, the need to roll the material in a batch type process to form the springs requires that the spring material be produced in large quantities relative to common customer demand. Applications requiring small quantities of special material suffer because excess material must be purchased in order to support the rolling process, adding significant cost to the project.

Another challenge presented with respect to prior art flexure pivots relates to the braising of the components during the assembly process. Braising, which is often used to bond the components, requires high processing temperatures. The high braising temperatures is often in the heat treatment range of the spring material. Therefore, the braising temperature and heat treat temperature of the spring material must be compatible to avoid affecting the structural integrity of the spring material. This requirement severely limits the number of spring and braising materials that can be mated together.

In addition, the assembly of the quads to the flat springs and cylindrical sleeves is labor intensive and sensitive to proper positioning. This increases the assembly cost and limits the array of applications that can justify the benefits of using a prior art flexure pivot. Also, assembly of the springs to the quads becomes increasingly challenging as parts get smaller. This combined with the nearly fixed size of human hands limits the smallest scale that can use this construction, which is currently about ⅛" diameter.

In some cases, the springs are welded to the quads during the assembly process. One of the weaknesses of this technique is that the weld must be buried within the section of the quad. This requires that a notch remain where the spring enters the quad interface. Structurally this penetration resembles a crack, which increases local stress and limits the fatigue life of a welded flexure pivot of this construction.

Another challenge related to prior art flexure pivots is that the cutting and shaping of the quads requires dedicated stamping and shaping tools. This requirement limits low volume, custom application of pivots of this construction. While classical construction of flexure pivots is best suited for cylindrical exterior shapes, often applications require custom shapes or features in order to register the flexure pivot to mating parts of a final assembly. Integration of special features on flexure pivots requires intricate machining in order to produce the special shapes. This proves to be expensive which limits the array of applications that can justify use of a prior art flexure pivot.

As such, there is a need for a flexure pivot that enhances manufacturability, increases material options, reduces cost by facilitating automation techniques, and is dimensionally scalable to enhance the size range that the flexure pivot can be applied. The present invention addresses these needs as well as other needs.

BRIEF SUMMARY OF THE INVENTION

In general, the present invention is directed to a lamellar rotational flexure pivot that addresses the above-referenced limitations presented by prior art flexure pivots, such as material limitations, lower limits to size, speed and ease of manufacture and, reduced stress concentration at the mounting locations of the springs. These features and other features of the present invention will be described in more detail below.

One aspect of the present invention is directed to a lamellar rotational flexure pivot comprising a first pivot end including a first spring layer, a second spring layer and a first spacer layer disposed between the first and second spring layers, wherein the first spring layer may be rotationally offset from the second spring layer. The flexure pivot may further include a second pivot end including a third spring layer, a fourth spring layer and a second spacer layer disposed between the third and fourth spring layers, wherein the third spring layer may be rotationally offset from the fourth spring layer. Further, a divider layer may be disposed between the first and second pivot ends, wherein the first and second pivot ends are permitted to pivot relative to one another.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1A:
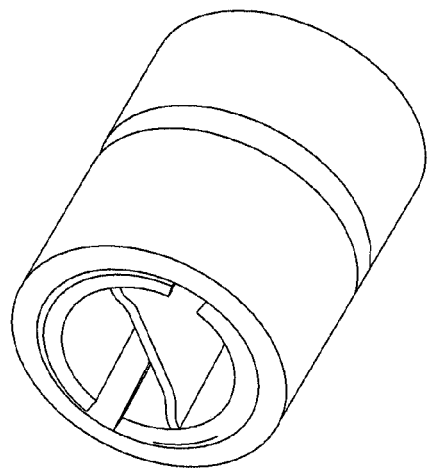
FIG. 1A is a perspective view of a prior art cantilevered flexure pivot.
Figure 1B:
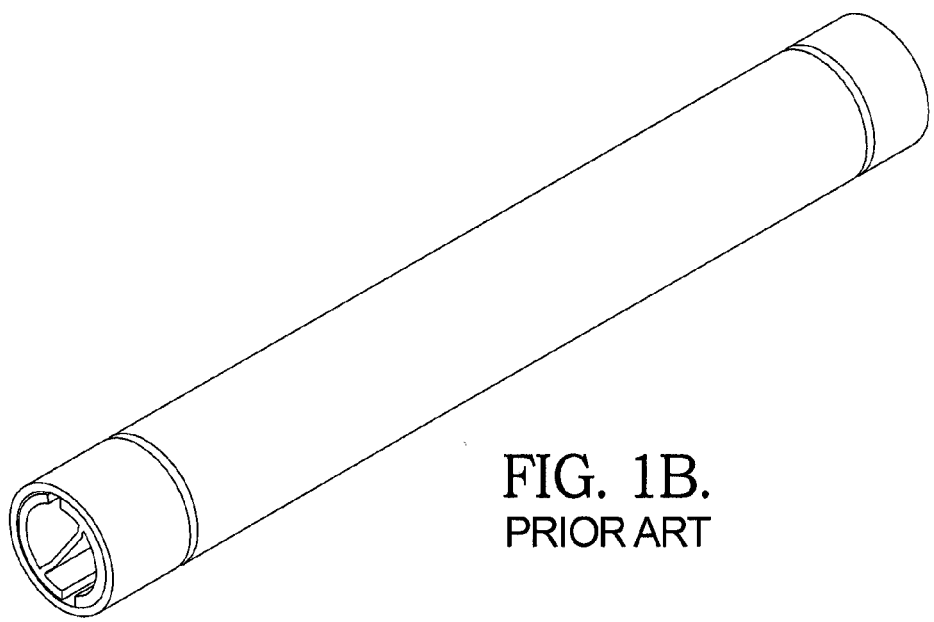
FIG. 1B is a perspective view of a prior art double-ended flexure pivot.
Figure 2:
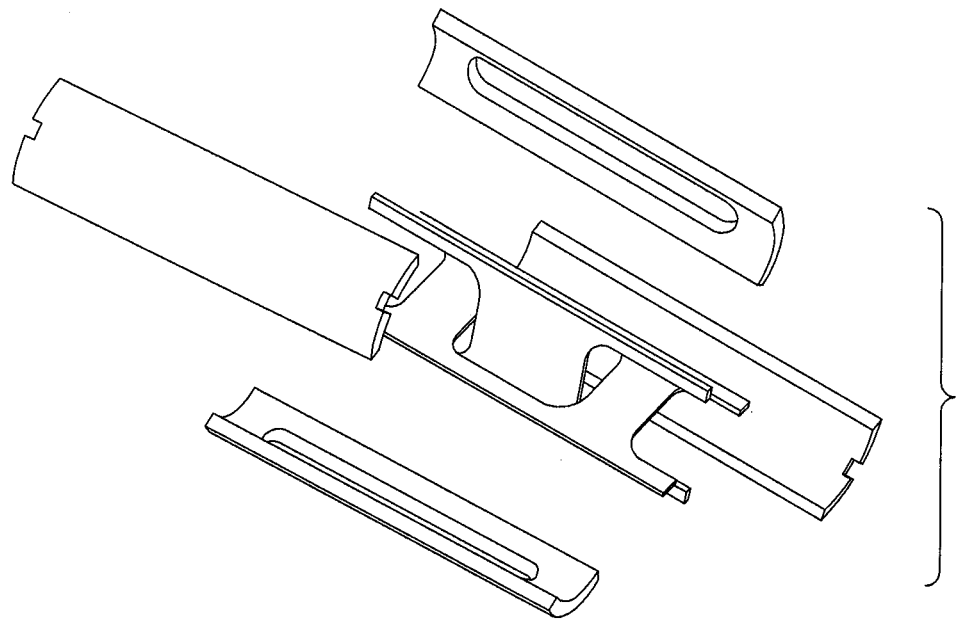
FIG. 2 is an exploded view of a core of the prior art flexure pivot shown in FIG. 1A.
Figure 3:
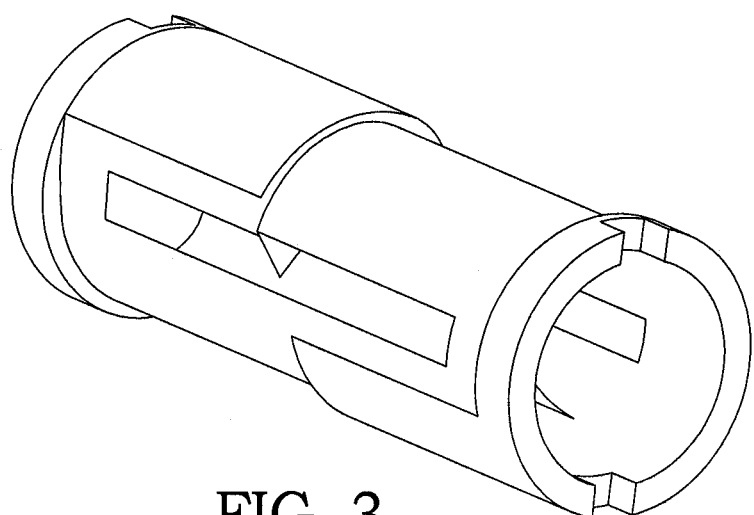
FIG. 3 is a perspective view of the core shown in FIG. 2 having undercuts machined in an outer diameter.
Figure 4:
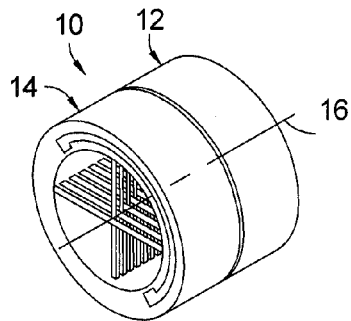
FIG. 4 is a perspective view of one embodiment of a lamellar rotational flexure pivot according to the present invention.
Figure 5:
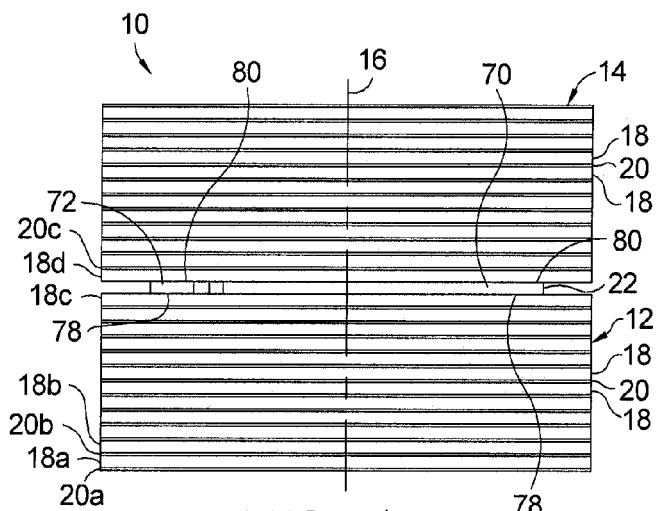
FIG. 5 is an elevation view of the lamellar rotational flexure pivot shown in FIG. 4.

Referring to the drawings in detail, and specifically to FIGS. 4 and 5, reference numeral 10 generally designates a lamellar rotational flexure pivot in accordance with one embodiment of the present invention. In general, flexure pivot 10 includes a first pivot end 12 that may be mounted to or integrally formed with one object A (e.g., FIGS. 13 and 14), and a second pivot end 14 that supports another object B, wherein flexure pivot 10 provides support on all degrees of freedom and allows for pivotal motion of the supported object B relative to the mounting object A about a longitudinal flexing axis 16 of the flexure pivot 10. Flexure pivot 10 is constructed by stacking a plurality of layers along flexing axis 16, which results in a unique construction that enhances manufacturability, increases material options, reduces cost by facilitating automation techniques, and is dimensionally scalable which enhances the size range that flexure pivot 10 can be applied. While flexure pivot 10 is described and shown herein as a cantilever-style flexure pivot, it should be understood that the scope of the invention also applies to a double-ended flexure pivot.

Figure 6:
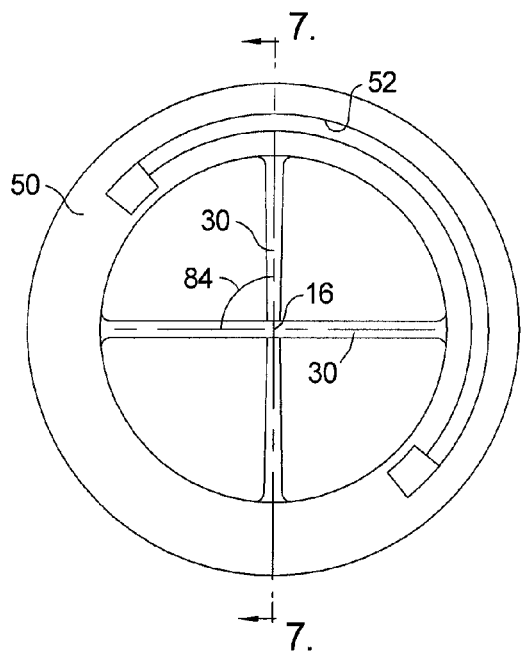
FIG. 6 is a top view of the lamellar rotational flexure pivot shown in FIG. 4.
Figure 7:
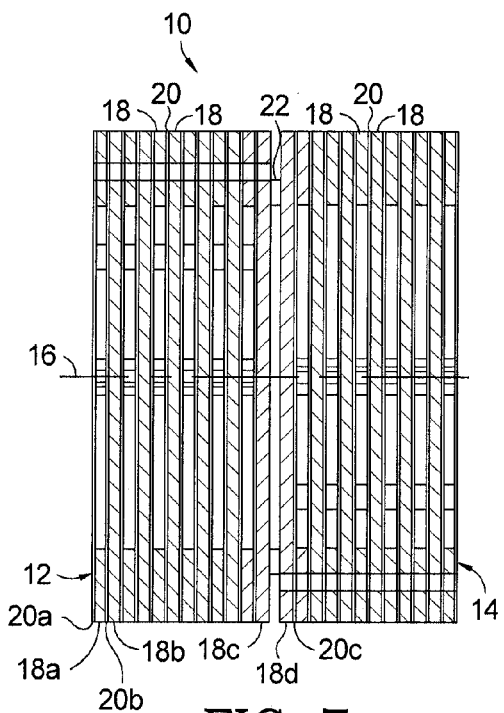
FIG. 7 is a cross-sectional view taken along line 7-7 in FIG. 6.

As best seen in FIGS. 5-7, both first and second pivot ends 12, 14 of flexure pivot 10 may be formed by stacking one or more spring layers 18 in an alternating sequence with one or more spacer layers 20 along flexing axis 16. A divider layer 22 is positioned between first and second pivot ends 12, 14, and the layers 18, 20, 22 are bonded or otherwise joined together to form a single unit. The unit is then configured to allow first and second pivot ends 12, 14 to pivot relative to one another thereby forming a flexure pivot 10, as will be described in more detail below.

Figure 9:
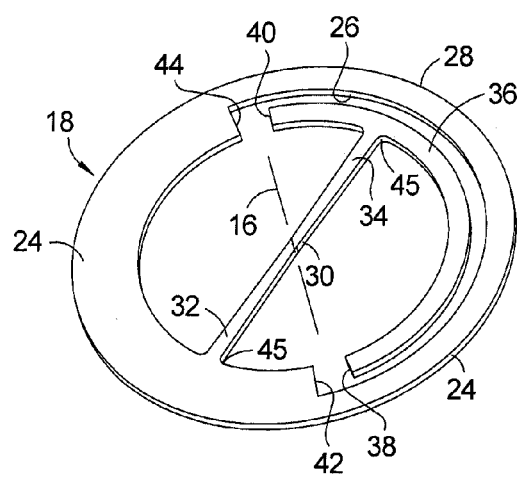
FIG. 9 is a perspective view of the spring layer shown in FIG. 8.
Figure 8:
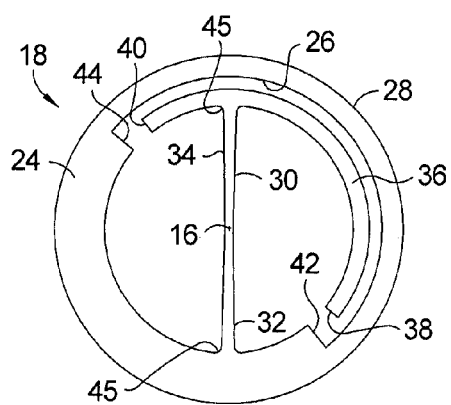
FIG. 8 is a top view of a spring layer included in the lamellar rotational flexure pivot shown in FIG. 4.

As best seen in FIGS. 8 and 9, the one or more of spring layers 18 may be flat planer discs include a surrounding support member 24 having an inner surface 26 that defines an opening, and an outer surface 28 that may be circular or non-circular (e.g., FIG. 13) depending on the application in which flexure pivot 10 is to be used. Spring layer 18 may further include a flexure arm 30 including first and second ends 32, 34, and an arc member 36 disposed within the opening. Surrounding support member 24 is a continuous annular ring and surrounds arc member 36. The first end 32 of flexure arm 30 is coupled with inner surface 26 of surrounding support member 24. Arc member 36 is coupled with second end 34 of flexure arm 30, is concertric with, and is spaced apart from inner surface 26 of surrounding support member 24. In one aspect, inner surface 26 of surrounding support member 24 may be curved to match the outer surface of arc member 36.

Arc member 36 further includes first and second distal ends 38, 40 that are configured for engaging corresponding stepped edges 42, 44 defined in inner surface 26 of surrounding support member 24 when first and second pivot ends 12, 14 rotate relative to one another during operation of flexure pivot 10. Further, second end 34 of flexure arm 30 may be coupled with arc member 36 adjacent to second distal end 40 of arc member 36, but it is also within the scope of the invention to couple second end 34 of flexure arm 30 anywhere along arc member 36. Also, flexure arm 30 may extend perpendicularly through flexing axis 16 of the flexure pivot 10 and in a plane parallel and/or coextensive with the plane formed by the flat spring layer 18.

One aspect of the present invention is that the spring component of layer 18 (i.e., flexure arm 30 and arc member 36) are integrally formed with surrounding support member 24, thereby allowing for a smooth transition from a flexible spring to a rigid outer support. The present invention allows optimized transition areas such as smooth radiuses 45 to be used, which greatly enhances the durability of flexure pivot 10. This is a significant improvement over the prior art because prior art flexure pivots require the springs to be manufactured separately from the rigid components and then joined. These prior art approaches produce either dimensional or material discontinuities at the flexible/rigid joint which limits the durability of the pivot and ultimately limits applications where it can be used.

Figure 10:
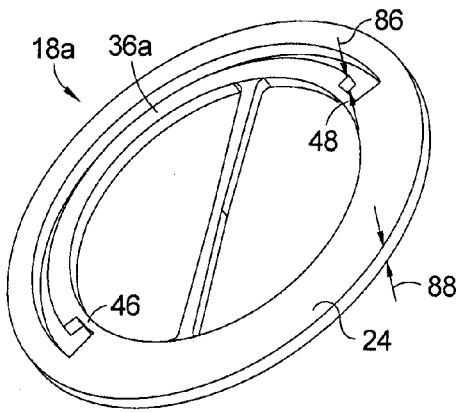
FIG. 10 is a perspective view of the spring layer in FIG. 8 including removable restraining beams and having an integrated spacer.

As best seen in FIG. 10, another embodiment of spring layer 18a may include one or more removable restraining beams 46, 48 that maintain the relative position of surrounding support member 24 and arc member 36 when flexure pivot 10 is being assembled.

Figure 11:
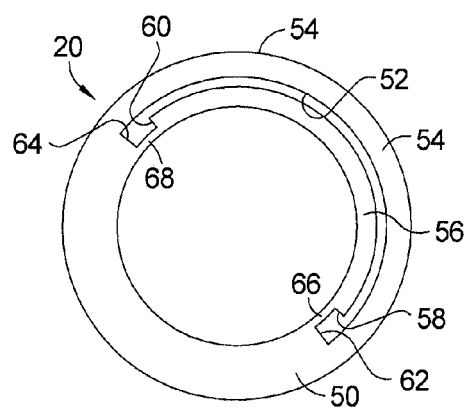
FIG. 11 is a top view of a spacer layer included in the lamellar rotational flexure pivot shown in FIG. 4.

As best seen in FIG. 11, the one or more spacer layers 20 may be flat planer discs and include a surrounding support member 50 having an inner surface 52 that defines an opening, and an outer surface 54 that may be circular or noncircular depending on the application in which flexure pivot 10 is to be used. Spacer layer 20 may further include an arc spacer 56 disposed within the opening formed by inner surface 52 of surrounding support member 50. Surrounding support member 50 is a continous annular ring and surrounds arc spacer 56. Arc spacer 56 is concentric with and spaced apart from inner surface 52 of surrounding support member 50. In one aspect, inner surface 52 of surrounding support member 50 may be curved to match the outer surface of arc spacer 56. Arc spacer 56 further includes first and second distal ends 58, 60 that are configured for engaging corresponding stepped edges 62, 64 defined in inner surface 52 of surrounding support member 50 when first and second pivot ends 12, 14 rotate relative to one another during operation of flexure pivot 10. Spacer layer 20 may further include one or more removable restraining beams 66, 68 that maintain the relative position of surrounding support member 50 and arc spacer 56 when flexure pivot 10 is being assembled.

Figure 12:
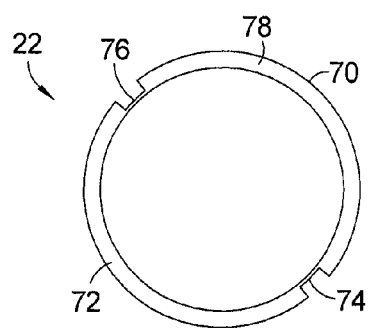
FIG. 12 is a top view of a divider layer included in the lamellar rotational flexure pivot shown in FIG. 4.

As best seen in FIG. 12, the divider layer 22 may be a flat planar disc and include first and second divider sections 70, 72 that are temporarily connected with one another by removable restraining beams 74, 76. Each of divider sections 70, 72 are configured to correspond with arc member 36 on spring layers 18 and/or arc spacer 56 on spacer layer 20 when flexure pivot 10 is assembled. As best seen in FIG. 5, each of divider sections 70, 72 include first and second connection surfaces 78, 80 for connecting first and second pivot ends 12, 14 to one another, as will be described in more detail below.

In one aspect of the invention, removable restraining beams 46, 48, 66, 68, 74, 76 that are formed in spacer layer 20, divider layer 22, and optionally spring layers 18, perform two functions. While layers 18, 20, 22 are being manufactured and handled prior to assembly, restraining beams 46, 48, 66, 68, 74, 76 keep layers 18, 20, 22 in proper position. After assembly, restraining beams 46, 48, 66, 68, 74, 76 help to hold position of layers 18, 20, 22 during bonding and then stiffen the assembly during post bond operations. Restraining beams 46, 48, 66, 68, 74, 76 are shaped and sized so as to allow easy removal for activation of the flexibility function of flexure pivot 10.

In assembling flexure pivot 10, spring layers 18, spacer layers 20, and a divider layer 22 are stacked to a desired height based on the parameters of the application in which flexure pivot 10 will be used. It should be understood that the number of spring layers 18 and spacer layers 20 used to form flexure pivot 10 shown in FIGS. 5 and 7 is merely exemplary, as any number of layers 18, 20 may be used to form flexure pivot 10.

As best seen in FIGS. 5 and 7, spacer layers 20 and spring layers 18 may be stacked in alternating fashion to form first pivot end 12. One way to begin the stacking is to start with a first spacer layer 20a, and then stacking a first spring layer 18a on top of first spacer layer 20a so that surrounding support member 24 of first spring layer 18a and surrounding support member 50 of first spacer layer 20a are positioned face to face with one another, and so that arc spacer 56 of first spacer layer 20a and arc member 36 of first spring layer 18a are positioned face to face with one another. A second spacer layer 20b is then stacked on top of first spring layer 10a so that surrounding support member 24 of first spring layer 18a and surrounding support member 50 of second spacer layer 20b are positioned face to face with one another, and so that arc spacer 56 of second spacer layer 20b and arc member 36 of first spring layer 18a are positioned face to face with one another. This stacking process may repeat by adding a second spring layer 18b as described above, and further spacer layers 20 and spring layers 18 until first pivot end 12 is complete.

Divider layer 22 may then be stacked on top of the last spring layer 18 or spacer layer 20 used in first pivot end 12. If the last layer positioned on first pivot end 12 is spring layer 18c, then first connection surface 78 of first divider section 70 is positioned adjacent to arc member 36 of spring layer 18c, and first connection surface 78 of second divider section 72 is positioned adjacent to surrounding support member 24 of spring layer 18c.

Spacer layers 20 and spring layers 18 may then be stacked in alternating fashion to form second pivot end 14 on top of divider layer 22. In particular, second connection surface 80 of first divider section 70 is coupled with surrounding support member 24 of spring layer 18d, and second connection surface 80 of second divider section 72 is coupled with arc member 36 of spring layer 18d. Further, spacer layer 20c and spring layer 18e may then be stacked on top of spring layer 18d. Specifically, surrounding support member 50 of spacer layer 20c and surrounding support members 24 of spring layers 18d, 18e are positioned face to face with one another, and arc spacer 56 of spacer layer 20c is positioned face to face with both arc members 36 of spring layers 18d, 18e. This stacking process repeats until assembly of second pivot end 14 and flexure pivot 10 is complete.

During the stacking process, the orientation of flexure arms 30 of spring layers 18 as they are stacked may be rotationally offset with respect to one another as shown in FIG. 6. For example, spring layers 18 may be rotationally offset at an angle 84 of between about thirty degrees and ninety degrees. It is also contemplated that spring layers 18 be aligned with one another so that flexure arms 30 are not rotationally offset from one another. It is also within the scope of the present invention that no spacer layers 20 be used between spring layers 18 so that spring layers 18 are aligned and mated face to face to form a single compound layer. A compound layer may comprise of any number of layers and an assembly can be assembled with any number of compound layers and individual layers, arranged as required by the application.

As best seen in FIG. 10, spring layer 18a may also be formed to include an integrated spacer, thereby eliminating the need for a separate spacer layer. The spacer would be integrated into arc member 36a by making the thickness 86 of arc member 36a greater than the thickness 88 of surrounding support member 24 to provide adequate spacing between a spring layer 18a that is stacked on top or below another spring layer 18, 18a. This variation requires an additional step to cut back the spring surface, but reduces the number of layers to generate and assemble flexure pivot 10.

After assembly of flexure pivot is complete, all of the components of the assembly positioned face to face with one another are bonded or otherwise coupled together to form a single unit. Thereafter, all of removable restraining beams 46, 48, 66, 68, 74, 76 are removed to allow first pivot end 12 to pivot relative to second pivot end 14 about flexing axis 16.

Figure 13:
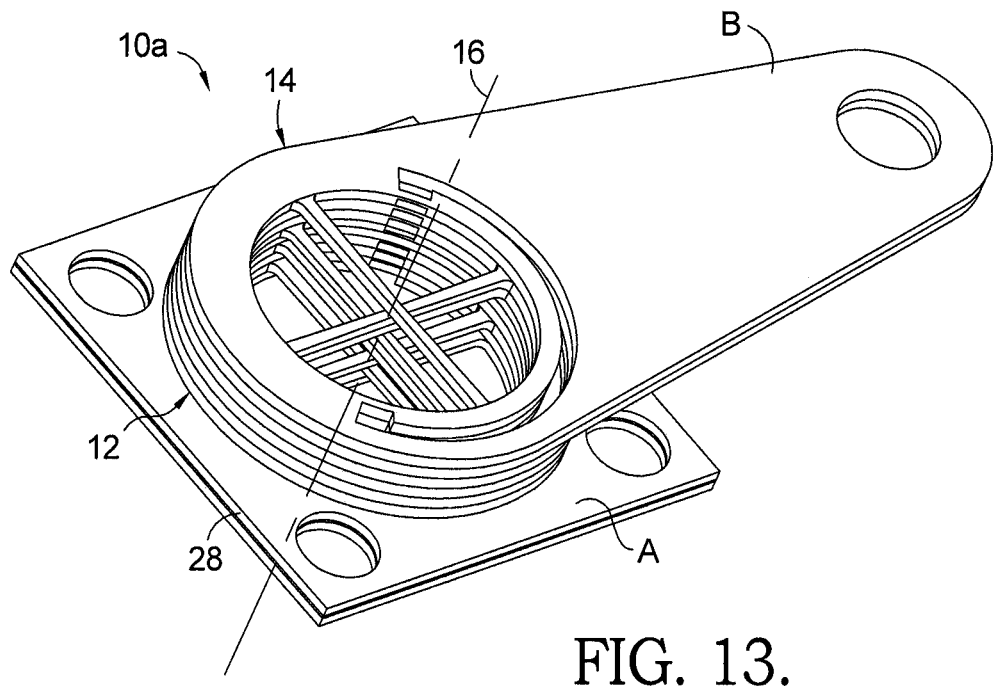
FIG. 13 is a perspective view of a second embodiment of a lamellar rotational flexure pivot according to the present invention.
Figure 14:
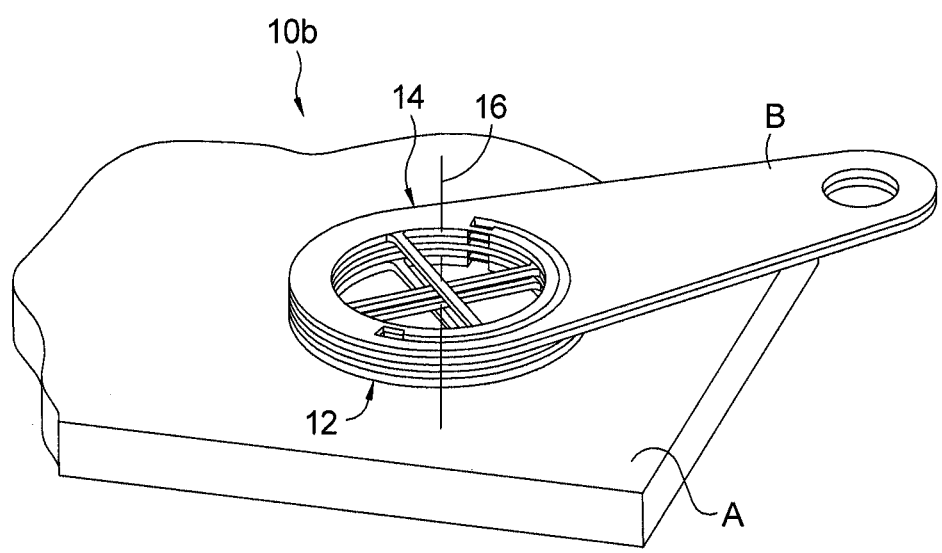
FIG. 14 is a perspective view of a third embodiment of a lamellar rotational flexure pivot according to the present invention.

In operation, with reference to FIGS. 9, 13 and 14, one or more of layers 18, 20 that form first pivot end 12 may be integrated or otherwise coupled to a mounting object A, and one or more of layers 18, 20 that form second pivot end 12 may be integrated or otherwise coupled with a supported object B. When supported object B rotates about flexing axis 16, surrounding support members 24, 50 of spring layers 18 and spacer layers 20 of second pivot end 14 will rotate about flexing axis 16, and the stepped edges 42, 44 will contact the corresponding distal end 38, 40 of arc member thereby defining a limit of rotation. As surrounding support members 24, 50 rotate, each of the flexure arms 34 bend or flex allowing for the rotation of the supported object B, but at the same time providing a restoring torque that will bias surrounding support members 24, 50 back to the normal starting position.

The present invention provides a number of advantages that overcome the problems and deficiencies that exist with prior art flexure pivots. For example, one advantage provided by the present invention is that assembly is in one direction. This greatly simplifies assembly and restraint during bonding. Only one assembly step and one bonding step are required to form flexure pivot. Another aspect of the present invention is that any number of layers can be stacked to form flexure pivot. This allows greater flexibility to the designer to meet the dimensional requirements of an application.

Another advantage of the present invention is that all of the layers are flat. Therefore, many shape-producing technologies may be used to produce the required shapes for layers. Cutting technologies may be used, such as, but not limited to, dye cutting, laser cutting, torch or plasma cutting, water jet cutting, electrochemical machining and wire electro-discharge machining. Furthermore, layers may be formed of metal or any other material that is capable of withstanding the forces imposed on the flexure pivot.

Another aspect of the present invention is that only one type of cutting operation is required to form all of layers. No forming operations are required. This greatly simplifies creation of components relative to the prior art. Yet another aspect of this invention is that the lateral cross section of the flexure pivot is determined by the layer cutting process as opposed to a rolling or other thickness generating process. This puts greater control into the hands of the applications engineer when defining stiffness characteristics of flexure pivot. This advantage addresses the limitations of classical spring manufacture, such as precision rolling.

Also, the present invention allows non-circular layers to be printed and fastened to the pivot in order to integrate mounting features into the pivot (FIG. 13). In this instance, printing refers to all operations that are used to form a sheet into a required shape, including removal and depositing of material. The invented approach is superior to prior art configurations in this regard because printing features and layering them is more efficient than the manufacturing processes required to machine special features on the outside of prior art flexure pivots, for example lathe and mill operations. The present invention does not preclude post assembly machining, but greatly reduces the need for such. Ease of mounting feature integration greatly enhances the applicability of flexure pivots into many applications because of reduced overall manufacturing costs, reduced assembly part count and elimination of physical connections which increase assembly size and weight. Integration also eliminates fastening points which eliminates possible failure modes. Assembly here refers to the application into which the flexure pivot mounts.

Another aspect of the present invention is that both cutting and bonding of layers are easily adapted to lithography manufacturing technology. Layers may be formed and deposited/bonded upon previously formed layers. This aspect opens up the applicability of the present invention to sizes down to nano-scale applications such as micro-machines (FIG. 14). Possible uses for the present invention may be applied to photonic circuitry, micro hydraulic circuitry and electronic circuitry. The present invention is well suited to support elements that require rotational alignment, such as mirrors, valve components, and magnetic elements.

The present invention is also adaptable to many layering techniques such as, but not limited to, electroplating, chemical vapor deposition and physical vapor deposition. This versatility greatly opens the field of applicable materials including polymers, ceramics, and glasses. The present invention, when applied using photolithography, as with electronic circuits, can be duplicated extremely efficiently so that a single series of manufacturing steps can produce large arrays of flexure pivot elements on a substrate making it viable for application into complex systems.

Another aspect of the present invention is the interlaced positioning of the spring layers. Unlike prior art flexure pivots which utilize a minimum number of distinct spring elements, the present invention spaces a plurality of smaller springs (i.e., spring layers) along the flexing axis of flexure pivot. This distribution of springs distributes the internal loads more evenly across the flexure pivot thereby providing better support of laterally applied loads.

Figure 15:
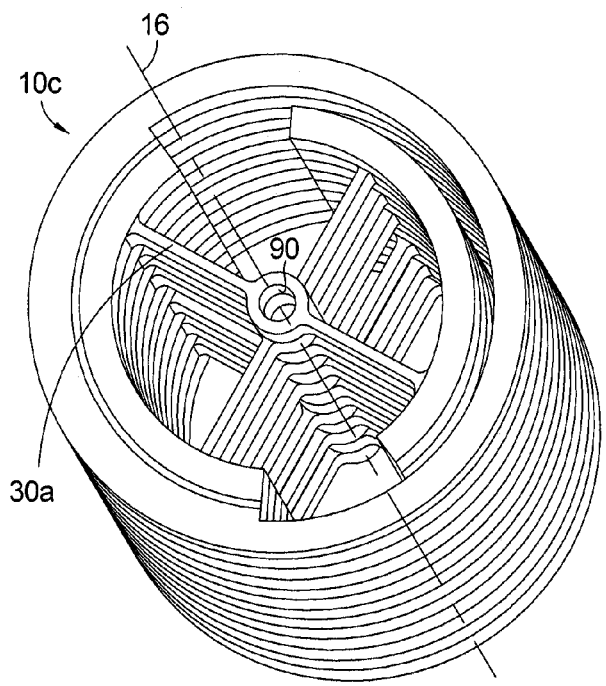
FIG. 15 is a perspective view of a fourth embodiment of a lamellar rotational flexure pivot according to the present invention.

In some applications, it is necessary to pass objects through the center of a flexure pivot from one end to the other end, such as electrical wires, tubes for the conduction of gasses and fluids, structural members such as beams and cable, and beams of light. Passage of objects through prior art flexure pivots is problematic because the passages have moveable walls due to the flexing of the springs, which can cause unwanted interferences. To accommodate these applications, another aspect of the present invention is provided. As best seen in FIG. 15, a flexure pivot 10c is provided and includes a structure similar to that described above with respect to flexure pivot 10, except that an aperture 90 is defined in flexure arm 30a. Aperture 90 may be circular or any other desired shape that will accommodate a given application. Aperture 90 may be positioned along flexing axis 16 so that it extends through the entire longitudinal length of flexure pivot 10c.

The layered design of flexure pivot 10c with a pass thru aperture 90 is an improvement over prior art flexure pivots with leaf-type springs because producing such a feature along the plane of a leaf-type spring would be very challenging and time consuming. The flexure pivot of the present invention is well suited to creation of such passageways because of the direction of material cutting lines up with the axis of aperture 90, and thus a single aperture 90 feature can easily be reproduced for all layers.

Figure 16:
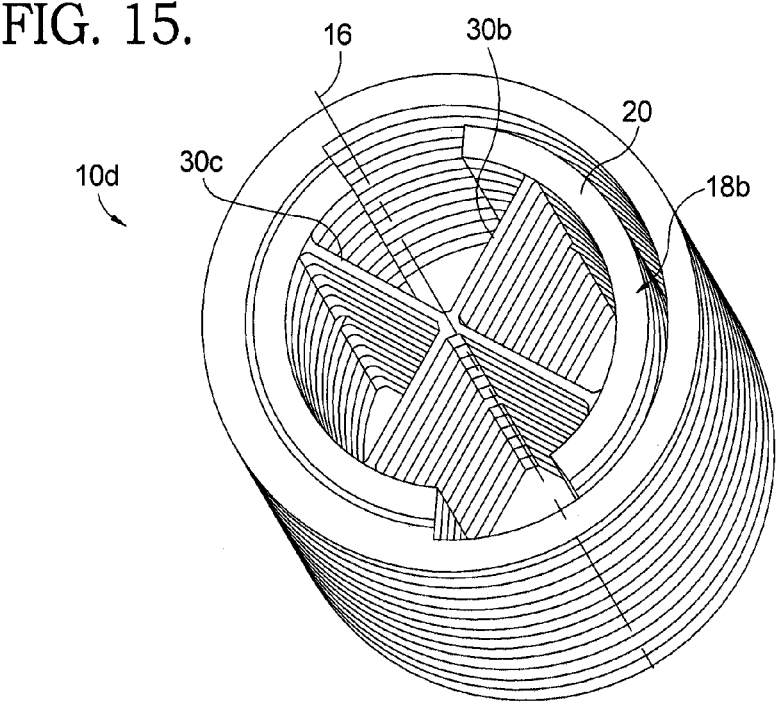
FIG. 16 is a perspective view of a fifth embodiment of a lamellar rotational flexure pivot according to the present invention.
Figure 17:
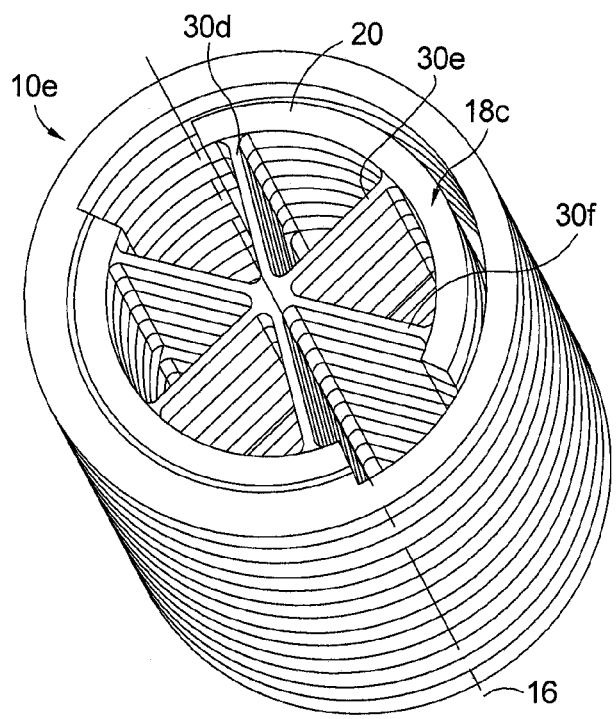
FIG. 17 is a perspective view of a sixth embodiment of a lamellar rotational flexure pivot according to the present invention.
Figure 18:
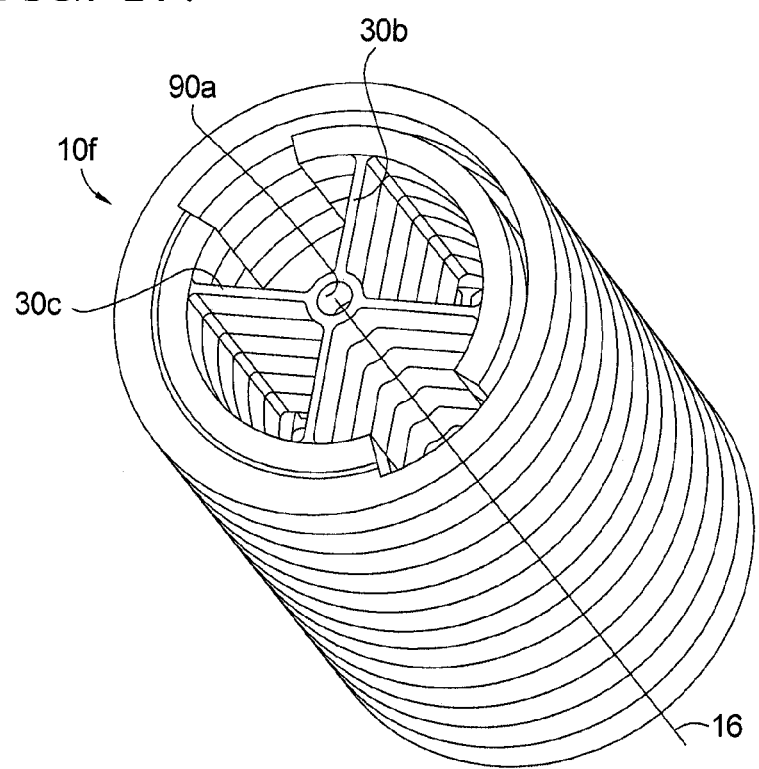
FIG. 18 is a perspective view of a seventh embodiment of a lamellar rotational flexure pivot according to the present invention.

Some system designs require rotational flexing such that little or no shift of the central axis of one half of the flexure pivot to the other half cannot be tolerated. X-spring pivots can meet this design constraint, but they are typically expensive to produce due to the complex shapes that need to be formed to generate the spring. Another embodiment of the present invention includes an X-spring layer 18b, 18c, as best seen in FIGS. 16 and 17. X-spring layer 18b incorporates two flexure arms 30b, 30c, and X-spring layer 18c includes more than two flexure arms 30d, 30e, 30f that are oriented angularly relative to each other. Flexure arms 30b, 30c may be positioned relative to one another with interior angles between about thirty degrees to about ninety degrees. The flexure arms 30b, 30c form a cross at flexing axis 16 of flexure pivot 10d. The X-spring 18b in flexure pivot 10d provides the added benefit of producing less center shift between first and second pivot ends 12, 14 during pivoting. The present invention lends itself to the X-spring design because all of the spring layers 18b, 18c may be formed in a single cutting operation per layer, and this operation can be duplicated for subsequent layers. As best seen in FIG. 18, it is also within the scope of the present invention to provide a flexure pivot 10f including an aperture 90a defined in the plurality of flexing arms 30b, 30c along flexing axis 16.

Although the present invention has been described in considerable detail with reference to certain aspects thereof, other versions are possible. Therefore, the spirit and scope of the appended claims should not be limited to the description of the aspects contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

What is claimed is

1. A lamellar rotational flexure pivot including a longitudinal flexing axis, the lamellar rotational flexure pivot comprising:
   a first pivot end including a first spring layer, a second spring layer and a first spacer layer disposed between said first and second spring layers;
   a second pivot end including a third spring layer, a fourth spring layer and a second spacer layer disposed between said third and fourth spring layers; and
   a divider layer disposed between said first and second pivot ends, wherein said first and second pivot ends are permitted to pivot relative to one another,
   wherein each of said first, second, third and fourth spring layers and said divider layer is a flat planar disc,
   wherein said first, second, third and fourth spring layers and said divider layer are concentrically aligned and axially stacked so they are connected with one another along said longitudinal flexing axis,
   wherein each of said first, second, third and fourth spring layers include:
      a surrounding support member including an inner surface defining an opening;
      a flexure arm including first and second ends; and
      an arc member disposed within said opening,
      wherein said surrounding support member is a continuous annular ring and surrounds said arc member,
      wherein said flexure arm, said arc member, and said surrounding support member are integrally formed of one piece of material,
      wherein said first end of said flexure arm is coupled with said inner surface of said surrounding support member, and
      wherein said arc member is coupled with said second end of said flexure arm, said arc member is concentric with and spaced apart from said inner surface of said surrounding support member, wherein said flexure arm on at least one of said first, second, third, and fourth spring layers are rotationally offset from said flexure arm on another of said first, second, third, and fourth spring layers.

2. A lamellar rotational flexure pivot in accordance with claim 1, wherein an outer surface of said surrounding support member is either circular or non-circular.

3. A lamellar rotational flexure pivot in accordance with claim 1, wherein said inner surface of said surrounding support member has first and second stepped edges configured for engaging first and second distal ends of said arc member, respectively.

4. A lamellar rotational flexure pivot in accordance with claim 3, wherein said flexure arm is coupled with said arc member adjacent to said first distal end of said arc member, and wherein said flexure arm extends perpendicularly through a longitudinal flexing axis of said lamellar rotational flexure pivot.

5. A lamellar rotational flexure pivot in accordance with claim 1, wherein said surrounding support member and said arc member of a single spring layer are directly connected by at least one restraining beam, wherein said single spring layer is any of said first, second, third or fourth spring layers.

6. A lamellar rotational flexure pivot in accordance with claim 1, wherein said flexure arm on said at least one of said first, second, third, and fourth spring layers is rotationally offset ninety degrees from said flexure arm on said another of said first, second, third, and fourth spring layers.

7. A lamellar rotational flexure pivot in accordance with claim 1, wherein each of said first and second spacer layers is a flat planar disc and include:
   a surrounding support member including an inner surface defining an opening; and
   an arc spacer disposed within said opening,
   wherein said surrounding support member is a continuous annular ring and surrounds said arc spacer,
   wherein said arc spacer is concentric with and spaced apart from said inner surface of said surrounding support member, and
   wherein said first, second, third and fourth spring layers, said first and second spacer layers, and said divider layer are concentrically aligned and axially stacked so they are connected with one another along said longitudinal flexing axis.

8. A lamellar rotational flexure pivot in accordance with claim 7, wherein said inner surface of said surrounding support member of each of said first and second spacer layers has third and fourth stepped edges configured for engaging first and second distal ends of said arc spacer, respectively.

9. A lamellar rotational flexure pivot in accordance with claim 7, wherein said surrounding support member and said arc spacer of a single spacer layer are directly connected by at least one restraining beam, wherein said single spacer layer is either said first spacer layer or said second spacer layer.

10. A lamellar rotational flexure pivot in accordance with claim 7, wherein said divider layer includes first and second divider sections, wherein each of first and second divider sections have first and second connection surfaces.

11. A lamellar rotational flexure pivot in accordance with claim 10, wherein said first and second divider sections are directly connected to one another by at least two restraining beams.

12. A lamellar rotational flexure pivot in accordance with claim 10, wherein said surrounding support member of said first spacer layer is coupled with said surrounding support members of said first and second spring layers,
wherein said arc spacer of said first spacer layer is coupled with said arc members of said first and second spring layers,
wherein said surrounding support member of said second spacer layer is coupled with said surrounding support members of said third and fourth spring layers,
wherein said arc spacer of said second spacer layer is coupled with said arc members of said third and fourth spring layers,
wherein said first connection surface of said first divider section is coupled with said arc member of said first spring layer,
wherein said first connection surface of said second divider section is coupled with said surrounding support member of said first spring layer,
wherein said second connection surface of said first divider section is coupled with said surrounding support member of said third spring layer, and
wherein said second connection surface of said second divider section is coupled with said arc member of said third spring layer.

13. A lamellar rotational flexure pivot in accordance with claim 1, wherein said flexure arm defines an aperture, wherein said longitudinal flexing axis of said lamellar rotational flexure pivot extends through said aperture.

14. A lamellar rotational flexure pivot in accordance with claim 1, wherein said flexure arm is a first flexure arm, wherein at least one of said first, second, third and fourth spring layers further include a second flexure arm having first and second ends, wherein said first end of said second flexure arm is coupled with said inner surface of said surrounding support member, wherein said arc member is coupled with said second end of said second flexure arm, and wherein said first and second flexure arms intersect with one another.

15. A lamellar rotational flexure pivot in accordance with claim 14, wherein said first and second flexure arms intersect with one another at said longitudinal flexing axis of said lamellar rotational flexure pivot.

16. A lamellar rotational flexure pivot in accordance with claim 15, wherein said first and second flexure arms intersect to form an angle of between about thirty degrees and about ninety degrees relative to one another.

17. A lamellar rotational flexure pivot in accordance with claim 14, wherein said first and second flexure arms define an aperture, wherein said flexing axis of said lamellar rotational flexure pivot extends through said aperture.

18. A lamellar rotational flexure pivot in accordance with claim 1, wherein each of said first, second, third and fourth spring layers include:
a plurality of flexure arms, each of said plurality of flexure arms including first and second ends,
wherein said first end of each of said plurality of flexure arms is coupled with said inner surface of said surrounding support member, and
wherein said arc member is coupled with said second end of each of said plurality of flexure arms.

19. A lamellar rotational flexure pivot in accordance with claim 18, wherein each of said plurality of said flexure arms intersect with one another at said longitudinal flexing axis of said lamellar rotational flexure pivot.

20. A lamellar rotational flexure pivot in accordance with claim 1, wherein said first spacer layer is integrally formed with at least one of said first and second spring layer, and wherein said second spacer layer is integrally formed with at least one of said third and fourth spring layer.

21. A lamellar rotational flexure pivot in accordance with claim 20, wherein said first spacer layer is integrally formed in said arc member of said at least one of said first and second spring layer, said first spacer layer being formed by a first thickness of said arc member that is greater than a second thickness of said surrounding support member, and
wherein said second spacer layer is integrally formed in said arc member of said at least one of said third and fourth spring layer, said second spacer layer being formed by a third thickness of said arc member that is greater than a fourth thickness of said surrounding support member.

22. A lamellar rotational flexure pivot in accordance with claim 1,
wherein said flexure arm of said spring layer is rationally aligned with said flexure arm of said second spring layer, and
wherein said flexure arm of said third spring layer is rotationally aligned with said flexure arm of said fourth spring layer.

23. A lamellar rotational flexure pivot in accordance with claim 7, wherein said each of said first and second spacer layers do not include a flexure arm extending between said surrounding support member and said arc spacer.

24. A lamellar rotational flexure pivot comprising:
a first pivot end including a first spring layer, a second spring layer and a first spacer layer disposed between said first and second spring layers, said first spring layer being rotationally offset approximately ninety degrees from said second spring layer;
a second pivot end including a third spring layer, a fourth spring layer and a second spacer layer disposed between said third and fourth spring layers, said third spring layer being rotationally offset approximately ninety degrees from said fourth spring layer; and
a divider layer disposed between said first and second pivot ends, wherein said first and second ends are permitted to pivot relative to one another about a longitudinal flexing axis,
wherein each of said first, second, third and fourth spring layers, said first and second spacer layers, and said divider layer is a planar disc,
wherein said first, second, third and fourth spring layers, said first and second spacer layers, and said divider layer are concentrically aligned and axially stacked so they are connected with one another along said longitudinal flexing axis,
wherein each of said first, second, third, and fourth spring layers include:
a first surrounding circular support member including an inner surface defining an opening, said inner surface of said first surrounding circular support member having first and second stepped edges;

an elongated flexure arm including first and second ends; and an arc member concentrically disposed within said opening of said first surrounding circular support member and spaced apart from said inner surface of said first surrounding circular support member, said surrounding support member being a continuous annular ring and surrounding said arc member, said arc member having first and second distal ends configured for engaging said respective first and second stepped edges, said first end of flexure arm being coupled with said inner surface of said first surrounding circular support member, said flexure arm extending perpendicularly through said flexing axis, said second end of said flexure arm being coupled with said arc member adjacent to said first distal end of said arc member, and said flexure arm, said arc member, and said first surrounding circular support member being integrally formed of one piece of material, wherein said flexure arm on at least one of said first, second, third, and fourth spring layers are rotationally offset from said flexure arm on another of said first, second, third, and fourth spring layers, wherein each of said first and second spacer layers include:

a second surrounding circular support member including an inner surface defining an opening, said inner surface of said second surrounding circular support member having third and fourth stepped edges; and an arc spacer concentrically disposed within said opening of said second surrounding circular support member and spaced apart from said inner surface of said second circular surrounding support member, said surrounding support member is a continuous annular ring and surrounds said arc spacer, said arc spacer having third and fourth distal ends configured for engaging said respective third and fourth stepped edges, wherein said divider layer includes first and second divider sections, wherein each of said first and second divider sections have first and second connection surfaces, wherein said second surrounding circular support member of said first spacer layer is coupled with said first surrounding support members of said first and second spring layers, wherein said arc spacer of said first spacer layer is coupled with said arc members of said first and second spring layers, wherein said second surrounding circular support member of said second spacer layer is coupled with said first surrounding circular support members of said third and fourth spring layers, wherein said arc spacer of said second spacer layer is coupled with said arc members of said third and fourth spring layers, wherein said first connection surface of said first divider section is coupled with said arc member of said first spring layer, wherein said first connection surface of said second divider section is coupled with said first surrounding circular support member of said first spring layer, wherein said second connection surface of said first divider section is coupled with said first surrounding circular support member of said third. spring layer, and wherein said second connection surface of said second divider section is coupled with said arc member of said third spring layer.

25. A lamellar rotational flexure pivot in accordance with claim 24, wherein said first surrounding circular support member and said arc member of a single spring layer are directly connected by at least one restraining beam, wherein said single spring layer is any of said first, second, third or fourth spring layers, wherein said second surrounding support member and said arc spacer of a single spacer layer are directly connected by at least one restraining beam, wherein said single spacer layer is either said first spacer layer or said second spacer layer, and wherein said first and second divider sections are directly connected to one another by at least two restraining beams.

26. A method of forming a lamellar rotational flexure pivot including a longitudinal flexing axis, the method comprising:

providing first, second, third, and fourth spring layers, wherein each of said first, second, third and fourth spring layers is a planar disc, wherein each of said first, second, third and fourth spring layers include a first surrounding support member, a flexure arm, an arc member, and at least one restraining beam directly connecting said first surrounding circular support member and said arc member, said first surrounding support member including an inner surface defining an opening, said inner surface of said first surrounding support member having first and second stepped edges, said flexure arm including first and second ends, said arc member being disposed within said opening of said first surrounding support member and concentric with and spaced apart from said inner surface of said first surrounding support member, said first surrounding support member being a continuous annular ring surrounding said arc member, wherein said flexure arm, said arc member, and said first surrounding support member are integrally formed of one piece of material, said arc member having first and second distal ends configured for engaging said respective first and second stepped edges, said first end of flexure arm being coupled with said inner surface of said first surrounding support member, said flexure arm extending perpendicularly through the longitudinal flexing axis of the lamellar rotational flexure pivot, said flexure arm being coupled with said arc member adjacent to said first distal end of said arc member;

providing first and second spacer layers, wherein each of said first and second spacer layers is a flat planar disc, wherein each of said first and second spacer layers include a second surrounding support member, an arc spacer, and at least one restraining beam directly connecting said second surrounding support member and said arc spacer, said second surrounding support member including an inner surface defining an opening, said inner surface of said second surrounding support member having third and fourth stepped edges, said arc spacer disposed within said opening of said second surrounding support member and concentric with and spaced apart from said inner surface of said second surrounding support member, said second surrounding support member being a continuous annular ring surrounding said arc member, said arc spacer having third and fourth distal ends configured for engaging said respective third and fourth stepped edges;

providing a divider layer including first and second divider sections, wherein said divider layer is a flat planar disc, wherein each of said first and second divider sections have first and second connection surfaces, and wherein said first and second divider sections are directly connected to one another by at least two restraining beams;

positioning said first spacer layer between said first and second spring layers so that said flexure arm of said first spring layer is rotationally offset from said flexure arm of said second spring layer;

coupling said second surrounding circular support member of said first spacer layer with said first surrounding support members of said first and second spring layers;

coupling said arc spacer of said first spacer layer with said arc members of said first and second spring layers;

positioning said second spacer layer between said third and fourth spring layers so that said flexure arm of said third spring layer is rotationally offset from said flexure arm of said fourth spring layer;

coupling said second surrounding circular support member of said second spacer layer with said first surrounding circular support members of said third and fourth spring layers;

coupling said arc spacer of said second spacer layer with said arc members of said third and fourth spring layers;

coupling said first connection surface of said first divider section with said arc member of said first spring layer;

coupling said first connection surface of said second divider section with said first surrounding circular support member of said first spring layer;

coupling said second connection surface of said first divider section with said first surrounding circular support member of said third spring layer; and coupling said second connection surface of said second divider section with said arc member of said third spring layer, wherein said first, second, third and fourth spring layers, said first and second spacer layers, and said divider layer are concentrically aligned and axially stacked so they are connected with one another along said longitudinal flexing axis.

27. A method in accordance with claim 26, further comprising:

removing said at least one restraining beam on each of said first, second, third and fourth spring layers;

removing said at least one restraining beam on each of said first and second spacer layers; and removing said at least two restraining beams on said divider layer.

* * * * *